(12) United States Patent
Uchiyama et al.

(10) Patent No.: US 7,405,882 B2
(45) Date of Patent: Jul. 29, 2008

(54) IMAGE DISPLAY DEVICE AND PROJECTOR

(75) Inventors: Shoichi Uchiyama, Shimosuwa-machi (JP); Junichi Nakamura, Shiojiri (JP); Takashi Nitta, Chino (JP); Tsunemori Asahi, Hotaka-machi (JP)

(73) Assignee: Seiko Epson Corporation, Tokyo (JP)

( * ) Notice: Subject to any disclaimer, the term of this patent is extended or adjusted under 35 U.S.C. 154(b) by 9 days.

(21) Appl. No.: 11/181,994

(22) Filed: Jul. 15, 2005

(65) Prior Publication Data

US 2006/0018040 A1     Jan. 26, 2006

(30) Foreign Application Priority Data

Jul. 23, 2004    (JP)    ............... 2004-215397

(51) Int. Cl.
G02B 27/14 (2006.01)
G02B 13/22 (2006.01)
G02B 17/00 (2006.01)
G03B 21/00 (2006.01)

(52) U.S. Cl. ............... 359/634; 359/629; 359/663; 359/726; 353/31

(58) Field of Classification Search ............... 359/618, 359/726, 277, 629, 634, 638, 247, 663; 353/31, 353/32–34, 81
See application file for complete search history.

(56) References Cited

U.S. PATENT DOCUMENTS 3,914,011 A * 10/1975 Mallinson et al. ........... 359/431
5,864,374 A    1/1999   Ito et al.
5,978,142 A * 11/1999 Blackham et al. ........... 359/618
6,646,806 B1 * 11/2003 Bierhuizen ................. 359/618
6,722,768 B1 * 4/2004 Takezawa ................... 353/20
2005/0063196 A1 * 3/2005 Li ............................. 362/551

FOREIGN PATENT DOCUMENTS

| JP | A 08-334736 | 12/1996 |
| JP | A 09-329761 | 12/1997 |
| JP | A 2001-100689 | 4/2001 |

* cited by examiner

Primary Examiner—Ricky L Mack
Assistant Examiner—Jack Dinh
(74) Attorney, Agent, or Firm—Oliff & Berridge, PLC

(57) ABSTRACT

Aspects of the invention can provide an image display device for modulating light from a light source on the basis of display image data to display an image. The image display device can include a first optically modulating device for modulating light from the light source, a second optically modulating device for modulating light from the first optically modulating device, a relay lens system provided between the first optically modulating device and the second optically modulating device for forming an optical image of the first optically modulating device on a light-receiving surface of the second optically modulating device, and at least one reflecting optical device provided between plural lenses forming the relay lens system.

14 Claims, 15 Drawing Sheets

| CONTROLLING VALUE | 0 | 1 | 2 | 3 | 4 | 5 |
|---|---|---|---|---|---|---|
| TRANSMITTANCE | 0.003 | 0.006 | 0.009 | 0.012 | 0.017 | 0.025 |
| CONTROLLING VALUE | 6 | 7 | 8 | 9 | 10 | 11 |
| TRANSMITTANCE | 0.038 | 0.06 | 0.09 | 0.15 | 0.23 | 0.33 |
| CONTROLLING VALUE | 12 | 13 | 14 | 15 | | |
| TRANSMITTANCE | 0.44 | 0.52 | 0.57 | 0.6 | | |

$T_{15} = (T_{11} \times 25 + T_{12} \times 5 + T_{13} \times 5 + T_{14} \times 1)/36$ $T_{19} = (T_{15} \times 1 + T_{16} \times 4 + T_{17} \times 4 + T_{18} \times 16)/25$

IMAGE DISPLAY DEVICE AND PROJECTOR

This application claims the benefit of Japanese Patent Application No. 2004-215397, filed Jul. 23, 2004. The entire disclosure of the prior application is hereby incorporated by reference herein in its entirety.

BACKGROUND

Aspects of the invention can relate to an image display device and a projector.

Improvements in picture quality of a related art electronic display device, such as an LCD (liquid crystal display), an EL (electro-luminescence) display, a plasma display, a CRT (cathode ray tube) and a projector have been remarkable and a device having a property such that resolution and the color gamut are almost equal to a visual characteristic of a human being has been almost put into practice. As for an intensity dynamic range, however, a reproduction range is generally at most around from 1 to 102 [nits] while a gradation number is 8 bits. On the other hand, as for human eyesight, it is said that an intensity dynamic range capable of perception at one time is around from 102 to 104 [nits] while intensity distinction ability is 0.2 [nits], which can be converted into 12 bits in gradation number. When a display image of a current display device is considered from a viewpoint of such a visual characteristic, narrowness of the intensity dynamic range is conspicuous in addition to lack of gradation of a shadow part or a highlighted part, so that the display image is not satisfied in reality and power.

In CG (computer graphics) used in movie films, games and the like, there has almost been a mainstream of the tendency to pursue reality in drawing with image data having an intensity dynamic range and a gradation characteristic, which are close to human eyesight, (refer to as HDR (high dynamic range) image data, hereinafter). A display device, however, lacks the performance for displaying the above. This causes a problem that expression ability, which is inherent in CG contents, cannot be sufficiently shown.

Further, in the next-generation OS (operating system), 16 bits of color space is planned to be adopted. This causes a dynamic range and a gradation number to be greatly increased, comparing with a case of using the current 8-bits color space. Accordingly, it is expected that a need for an electronic display device, which is capable of making the best use of the 16-bits color space and which has a high dynamic range and a high gradation, will be increased.

Among display devices, a projecting type of display device, such as a liquid crystal projector and a DLP (digital light processing, a registered trademark of the TI company) projector is a display device capable of large-screen display and effective for reproducing reality and power of a display image. In such a field of art, the following proposal has been made for the purpose of solving the above problems.

For a related or display device having a high dynamic range, there is a technique disclosed in, for example, Japanese Patent Application Publication 2001-100689. In the technique, a display device can include a light source, a second optically modulating device for modulating intensity of a whole wavelength range of light and a first optically modulating device for modulating intensity of respective wavelength ranges of the three primary colors RGB in the wavelength region of light and, in the display device, the light from the light source is modulated by technique of the second optically modulating device to form desired distribution of intensity, an optical image so formed is formed on a display surface of the first optically modulating device to be color-modulated and the secondarily modulated light is projected. Respective pixels of the second optically modulating device and the first optically modulating device are individually controlled on the basis of a first controlling value and a second controlling value, respectively, the first and second controlling values being determined on the basis of HDR display data. For the optically modulating device, used is a transmission type of modulating device, which has a pixel structure or a segment structure capable of individually controlling transmittance and which can control two-dimensional distribution of transmittance. As a typical example of the above, a liquid crystal light valve can be named. Moreover, a reflecting type of modulating device may be used instead of the transmission type of modulating device. A DMD (digital micro-mirror device) can be named as a typical example of the reflecting type of modulating device.

Here, considered is a case of using an optically modulating device in which transmittance in dark display is 0.2% while transmittance in bright display is 60%. An intensity dynamic range of a single optically modulating device is 60/0.2=300. Such a display device is equivalent to optically modulating devices, which have the intensity dynamic range of 300 and which are optically arranged in series. Accordingly, it is possible to obtain the intensity dynamic range of 300×300=90000. The same idea can be applied to a gradation number. Arranging optically in series optically modulating devices, which have an 8-bits gradation, allows a gradation number more than 8 bits to be obtained.

In the above description, Japanese Patent Application Publication 2001-100689 is an example of related art.

SUMMARY

In the invention disclosed in Japanese Patent Application Publication 2001-100689 mentioned above, an optical device for an illumination optical system, which has large optical aberration, is used to transmit an optical image formed by the first modulating device to the second modulating device. This causes a problem that it is difficult to precisely transmit illumination light having desired distribution of intensity of light to the first optically modulating device.

The projector shown in FIG. 17 can be for modulating light from the light source 10 on the basis of display image data to display an image. The projector can include plural first optically modulating devices 60R, 60G and 60B for controlling an optically transmission characteristic of light from the light source 10, an optically combining device 80 for combining light from the respective first optically modulating devices, a second optically modulating device 100 for controlling an optically transmission characteristic of light combined by the optically combining device, a relay lens system 90 for transmitting an optical image formed on the first optically modulating devices 60R, 60G and 60B to the second optically modulating device 100.

Such a structure allows an optical image formed on the plural first optically modulating devices 60R, 60G and 60B to be transmitted to the second optically modulating device 100 by the relay lens system 90 having high image-forming performance. Then, the optical aberration can be reduced in transmitting combined light. That is to say, combined light from the light combining means 80 can be transmitted to the second optically modulating device 100 with comparatively high precision, so that there is an effect obtained that image-forming precision of the combined light on the second optically modulating device 100 can be improved more than the conventional case.

FIG. 18 illustrates a relay lens system of FIG. 17. The above-mentioned relay lens system 90 requires that a variety of properties should be satisfied such that (1) luminous intensity should be around 2 in F-number for securing a sufficient light bundle in a projector, (2) resolution performance should be around 10 μm for transmitting distribution of a light amount in a unit of pixel of a transmission type of liquid crystal light valve, and (3) a both-sides telecentric characteristic is necessary for preventing picture quality from being deteriorated due to visual angle dependence of liquid crystal. In the case of using a transmission type of liquid crystal light valve having a screen size of around 1inch for the first optically modulating devices 60R, 60G and 6GB and the second optically modulating device 100, the relay lens system 90 having the above-mentioned properties (1) to (3) should be long such that a horizontal length thereof is 200 mm or more. As a result, a conjugate length, which is a distance between the first optically modulating device and the second optically modulating device, becomes 300 mm or more. This causes a problem that the projector is made large.

An advantage of the invention can be to provide an image display device and a projector, which are capable of miniaturization.

For the purpose of achieving the above-mentioned advantage, an image display device of the invention can be an image display device for modulating light from a light source on the basis of display image data to display an image. The image display device can include a first optically modulating device for modulating light from the light source, a second optically modulating device for modulating light from the first optically modulating device, a relay lens system provided between the first optically modulating device and the second optically modulating device for forming an optical image of the first optically modulating device on a light-receiving surface of the second optically modulating device, and at least one reflecting optical device provided between plural lenses forming the relay lens system.

Especially, it can be desirable that the above-mentioned relay lens system reverses a direction of transmitting light incident from the first optically modulating device by means of the reflecting optical device to emit the light to the second optically modulating device.

Thus, a horizontal length of the relay lens system in which a reflecting optical device is used to bend an optical path becomes shorter than that of a case of using no reflecting optical device. Accordingly, the image display device can be miniaturized.

Further, the relay lens system desirably has a both-sides telecentric characteristic.

With the both-sides telecentric characteristic, an image contrast in respective regions of a screen becomes substantially same, so that an image display device having good quality in displaying an image can be provided. The relay lens system having the both-sides telecentric characteristic is long in a horizontal direction since it can include many lenses. Accordingly, using a reflecting optical device for bending the optical path allows the image display device to be miniaturized.

Moreover, a first lens group and a latter lens group with respect to the reflecting optical device among plural lenses forming the relay lens system are desirably symmetrically provided. In accordance with such a structure, an optical design of the relay lens system can be simplified. In addition to the above, the reflecting optical device is desirably a reflecting type of polarizer. The reflecting type of polarizer is for transmitting a part of polarized light and for reflecting a part of polarized light among light bundles. Accordingly, it can function as a polarizing plate of each optically modulating device. This allows a polarized plate of each optically modulating device to be omitted, and thereby, a cost to be reduced.

Further, the reflecting optical device is desirably a wire grid type of polarizing filter. The wire grid type of polarizing filter has a simple structure, so that it can be easily manufactured. Moreover, such a filter is extremely superior in heat-resistance and hardly generates optical absorption since it is formed form an inorganic material. Using a wire grid type of polarizing filter with a polarizing plate of the respective optically modulating device being omitted allows a heat resistance character of an image display device to be improved.

The reflecting optical device may be a polarizing beam splitter.

The reflecting optical device is desirably formed on a prism surface of a reflecting prism. Using a reflection prism allows an air-converted length of an optical path of the relay lens system to be shortened. Accordingly, limitations in optical design of the relay lens system is decreased.

On the other hand, a projector in accordance with the invention can include: the above-mentioned image display device; and a projecting unit.

Such a structure allows the projector to be miniaturized.

BRIEF DESCRIPTION OF THE DRAWINGS

The invention will be described with reference to the accompanying drawings, wherein like numbers reference like elements, and wherein.

DETAILED DESCRIPTION OF PREFERRED EMBODIMENTS

Exemplary embodiments of the invention will be described hereinafter on the basis of the drawings.

Figure 1:
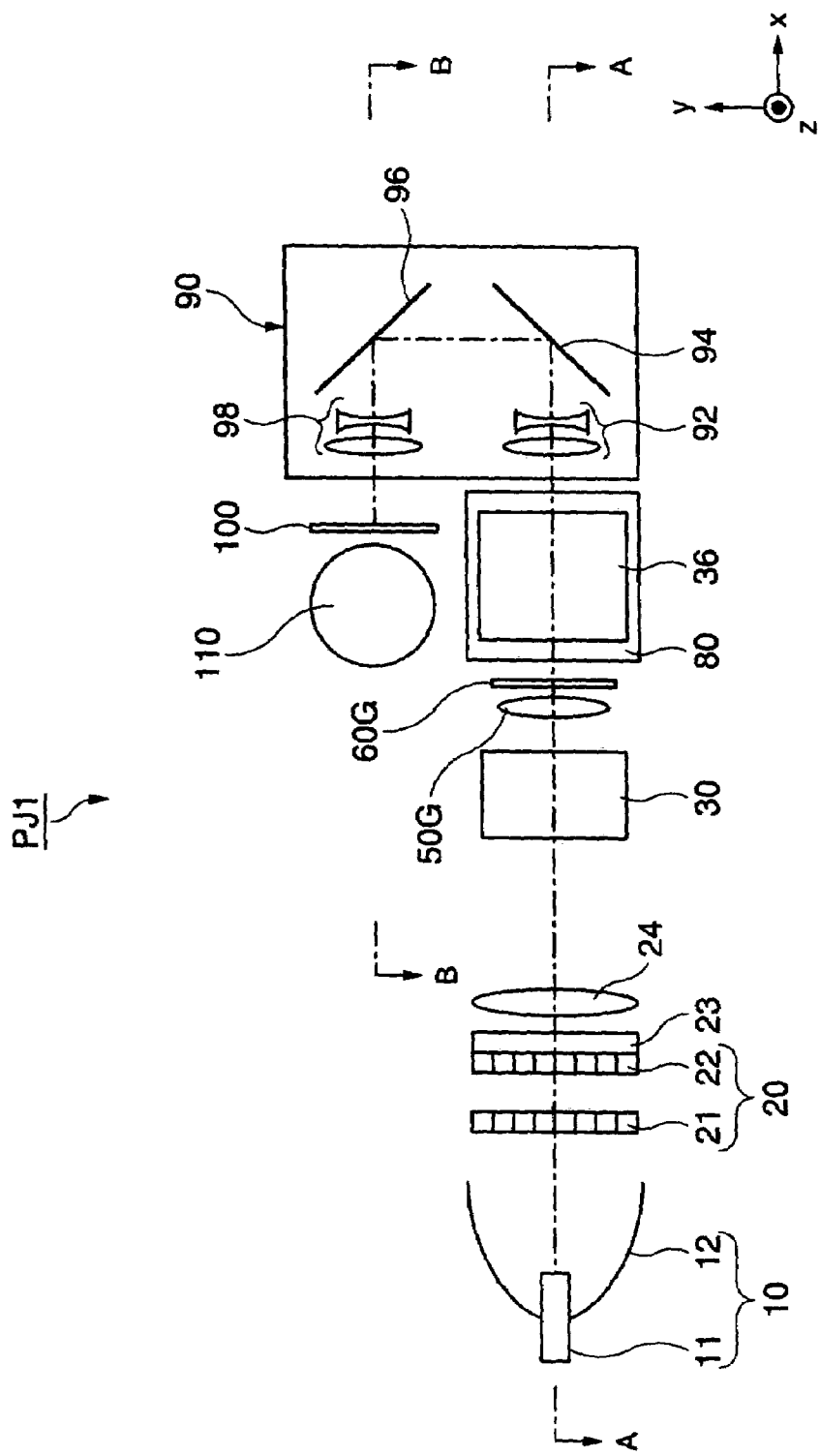
FIG. 1 is a side view of an image display device (a projector) in accordance with the invention.
Figure 2A:
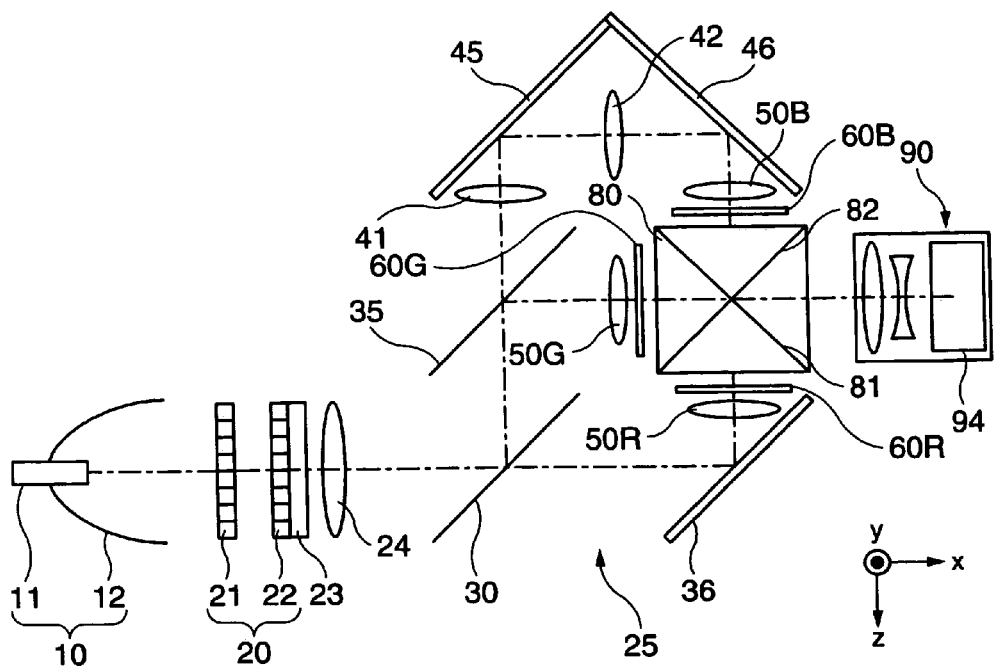
FIGS. 2A and 2B are sectionally plan views of an image display device (a projector) in accordance with the invention.
Figure 2B:
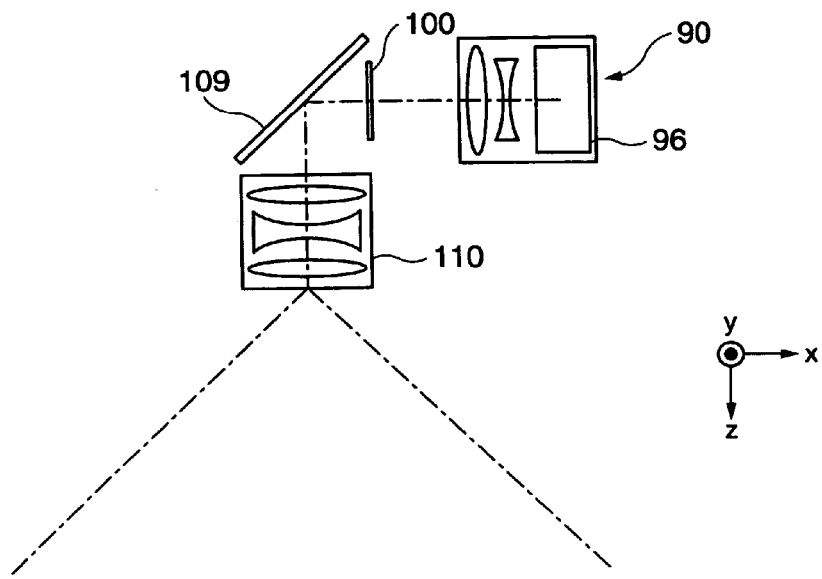

FIGS. 1, 2A and 2B show an example of an image display device and a projector of an exemplary embodiment. In FIGS. 1, 2A and 2B, shown is a main optical structure of a projector PJ1. FIG. 1 is a side view of the projector. FIG. 2A is a sectionally plan view along a line A-A in FIG. 1. FIG. 2B is a sectionally plan view along a line B-B in FIG. 1.

As shown in FIGS. 1, 2A and 2B, the projector PJ1 can include a light source 10, an uniform illumination system 20 for uniform distribution of intensity of light incident from the light source 10, a color modulating part 25 for respectively modulating intensity of the three primary colors RGB in a wavelength region of light incident from the uniform illumination system 20 (including three transmission type of liquid crystal light valves 60B, 60G and 60R as a first modulating device), a relay lens system 90 for relaying light incident from the color modulating part 25, a transmission type of liquid crystal light valve 100 used as a second modulating device for modulating intensity in a whole wavelength region of light incident from the relay lens system 90 and a projecting lens 110 for projecting light incident from the liquid crystal light valve 100 on a screen (not shown).

The light source 10 can include a lamp 11 formed from a ultra-high pressure mercury lamp, a Xenon lamp or such and a reflector 12 for reflecting and converging light emitted from the lamp 11.

The uniform illumination system 20 can include two lens arrays 21 and 22 including a fly-eye lens or the like, a polarization converting device 23 and a converging lens 24. The distribution of intensity of light from the light source 10 is uniformed by the two lens arrays 21 and 22. The uniformed light is polarized by the polarization converting device 23 in a polarizing direction in which the light can be incident on the color modulating part. The polarized light is converged by the converging lens 24 to be emitted to the color modulating part 25. The polarization converting device 23 can include a PBS (polarizing beam splitter) array and a one-half wavelength plate, for example, and is for converting random polarization into specific straight polarization.

The color modulating part 25 can include two dichroic mirrors 30 and 35 as an optically separating device, three mirrors (reflecting mirrors 36, 45 and 46), five field lenses (a lens 41, a relay lens 42 and paralleling lenses 50B, 50G and 50R), three liquid crystal light valves 60B, 60G and 60R and a cross-dichroic prism 80.

The dichroic mirrors 30 and 35 are for separating (dividing) light (white light) from the light source 10 into the light in the three primary colors RGB of red light (R light), green light (G light) and blue light (B light). The dichroic mirror 30 is formed from a dichroic film, which has a characteristic of reflecting the B light and the G light and transmitting the R light and which is formed on a glass plate or the like. The dichroic mirror 30 reflects the B light and the G light and transmits the R light, the B, G and R light being included in the white light from the light source 10. The dichroic mirror 35 is formed from a dichroic film, which has a characteristic of reflecting the G light and transmitting the B light. The dichroic mirror 35 reflects and transmits the G light of the G and B light, which are transmitted through the dichroic mirror 30, to the paralleling lens 50G and transmits the B light to the lens 41.

The relay lens 42 is for transmitting light in the vicinity of the lens 41 (distribution of intensity of light) to the vicinity of the paralleling lens 50B. The lens 41 has a function to cause light to be efficiently incident on the relay lens 42. The B light incident on the lens 41 is transmitted to the liquid crystal light valve 60B, which is separated in space, with distribution of intensity of the B light being almost maintained as it is and with little optical loss.

The paralleling lenses 50B, 50G and 50R have a function for substantially paralleling light in respective colors incident on the corresponding liquid crystal light valves 60B, 60G and 60R to narrow distribution of angle of incident light, and thereby, improve a display characteristic of the liquid crystal light valves 60B, 60G and 60R. The light in the primary colors RGB divided by the dichroic mirrors 30 and 35 is incident on the liquid crystal light valves 60B, 60G and 60R through the above-mentioned mirrors (the reflecting mirrors 36, 45 and 46) and the field lenses (the lens 41, the relay lens 42 and the paralleling lenses 50B, 50G and 50R).

The liquid crystal light valve 60B, 60G and 60R are active matrix type of liquid crystal display devices. In the active matrix type of liquid crystal display device, a TN type of liquid crystal is sandwiched between a glass substrate, which is formed in a matrix with a pixel electrode and a switching device for driving the pixel electrode such as a thin film transistor, a thin film diode or such, and a glass substrate, all over which a common electrode is formed, and a polarizing plate is provided on an outer surface.

The liquid crystal light valves 60B, 60G and 60R are driven in a normally white mode or a normally black mode contrary to the above. In the normally white mode, the liquid crystal valves 60B, 60G and 60R are white/bright (transmitted) when the voltage is not applied while they are black/dark (not transmitted) when the voltage is applied. In the above modes, gradation between light and shade is analog-controlled in accordance with a controlling value (a controlling voltage) given between the electrodes. The liquid crystal light valve 60B optically modulates the incident B light on the basis of the controlling value to emit the modulated light including an optical image. The liquid crystal light valve 60G optically modulates the incident G light on the basis of the controlling value to emit the modulated light including an optical image. The liquid crystal light valve 60R optically modulates the incident R light on the basis of the controlling value to emit the modulated light including an optical image.

The cross dichroic prism 80 has a structure in which four right-angled prisms are stuck to each other. Inside the cross dichroic prism 80, formed are a dielectric multi layer film for reflecting the B light (a B light reflecting dichroic film 81) and a dielectric multi layer film for reflecting the R light (an R light reflecting dichroic film 82) so as to be in the shape of X in a cross section of the cross dichroic prism 80. The cross dichroic prism 80 transmits the G light from the liquid crystal light valve 60G and bends the R light from the liquid crystal light valve 60R and the B light from the liquid crystal light valve 60B. The light in the above three colors are then combined to form a color image.

The relay lens system 90 is for transmitting the optical image (distribution of intensity of light) from the liquid crystal light valves 60B, 60G and 60R combined by the cross dichroic prism 80 to a display surface of the liquid crystal light valve 100. The relay lens system 90 in the exemplary embodiment is for refracting the light emitted from the cross dichroic prism 80 upward and further refracting the same in a horizontal direction to transmit an optical image to the liquid crystal light valve 100 disposed above the cross dichroic prism 80. A structure and a function of the relay lens system 90 will be described in detail below.

The liquid crystal light valve 100 has a structure equivalent to that of the above-mentioned liquid crystal light valves 60B, 60G and 60R. The liquid crystal light valve 100 modulates intensity of incident light in a whole wavelength range on the basis of the controlling value. The modulated light including a final optical image is then refracted at an angle of 90° by means of a mirror 109 to be emitted to a projecting lens 110.

The projecting lens 110 projects the optical image, which is formed on the display surface of the liquid crystal light valve 100, on a screen not shown in the drawings to display a color image.

A flow of optical transmission of the projector PJ1 as a whole will be described hereinafter. White light from the light source 10 is divided into the light in three primary colors of red (R), green (G) and blue (B) by means of the dichroic mirrors 30 and 35 while it is incident on the liquid crystal light valves 60B, 60G and 60R through lenses including the paralleling lenses 50B, 50G and 50R and mirrors. The liquid crystal light valves 60B, 60G and 60R are driven in accordance with the controlling value generated on the basis of later-mentioned HDR image data so as to be able to change transmittance of light in a unit of pixel. Accordingly, the light in the respective colors incident on the liquid crystal light valves 60B, 60G and 60R is optically modulated in accordance with respective wavelength ranges to be emitted as modulated light including an optical image.

The modulated light from the liquid crystal light valves 60B, 60G and 60R is respectively incident on the cross dichroic prism 80 to be combined into a bundle of light, and then, incident on the relay lens system 90. The relay lens system 90 refracts the incident combined light upward and further refracts the same in a horizontal direction to transmit the combined light to the liquid crystal light valve 100. The liquid crystal light valve 100 is also arranged to be driven in accordance with the controlling value generated on the basis of the later-mentioned HDR image data so as to be able to change transmittance of light in a unit of pixel. Accordingly, the combined light incident on the liquid crystal light valve 100 is intensity-modulated in a whole wavelength range to be emitted to the projecting lens 110 as modulated light including a final optical image. The projecting lens 110 projects the final combined light from the liquid crystal light valve 100 on a screen not shown in the drawings to display a desired image.

As described above, in the projector PJ1, used is a system for using a modulated light in which an optical image (image) is formed by means of the liquid crystal light valves 60B, 60G and 60R as a first optically modulating device to form a final display image by means of the liquid crystal light valve 100 as a second optically modulating device. In the projector PJ1, the light from the light source 10 is modulated in a two-phased image forming process through two light valves disposed in series. As a result, the projector PJ1 is capable of achieving enlargement in intensity dynamic range and increase in gradation number.

In the projector PJ1, the liquid crystal light valve 100 as a second optically modulating device is provided after the liquid crystal light valves 60B, 60G and 60R as a first optically modulating device and the cross dichroic prism 80 through the relay lens system 90 superior in image-forming performance. Accordingly, it is possible to reduce optical aberration of transmitted light more, and thereby, to improve accuracy in image forming (in transmission) more than a similar optical system of the related art in which the liquid crystal light valve 100 is provided before the dichroic mirrors 30 and 35 and the liquid crystal light valves 60B, 60G and 60R.

The liquid crystal light valves 60B, 60G and 60R and the liquid crystal light valve 100 are same in that both of them modulate intensity of transmitting light and include optical image corresponding to a degree of the modulation. They are different, however, in that the latter liquid crystal light valve 100 modulates light in a whole wavelength range (white light) while the former liquid crystal light valves 60B, 60G and 60R modulate light in a specific wavelength range, the light being divided by means of the dichroic mirrors 30 and 35, which is optically separating means, (the light in colors such as R, G and B). Therefore, for the sake of convenience, the modulation of intensity of light by the liquid crystal light valves 60B, 60G and 60R is referred to as color modulation while the modulation of intensity of light by the liquid crystal light valve 100 is referred to as intensity modulation for distinction. Further, from the same point of view, the liquid crystal light valves 60B, 60G and 60R are referred to as color modulation light valves while the liquid crystal light valve 100 is referred to as an intensity modulation light valve for distinction in the description below in some cases.

Contents of the controlling value to be inputted into the color modulation light valve and the intensity modulation light valve are described below. In the exemplary embodiment, the color modulation light valve has resolution higher than that of the intensity modulation light valve, and therefore, assumed is a case that the color modulation light valve determines display resolution (which is resolution perceived by an observer when he or she sees a display image of the projector PJ1). A relation of the display resolution is not limited to the above, of course. It is possible to use the color modulation light valve and the intensity modulation light valve, which have the same resolution. Moreover, a structure in which the intensity modulation light valve shows higher resolution than that of the color modulation light valve and in which the intensity modulation light valve determines the display resolution can be used.

A structure and a function of the relay lens system will be described in detail with the drawings.

Figure 3:
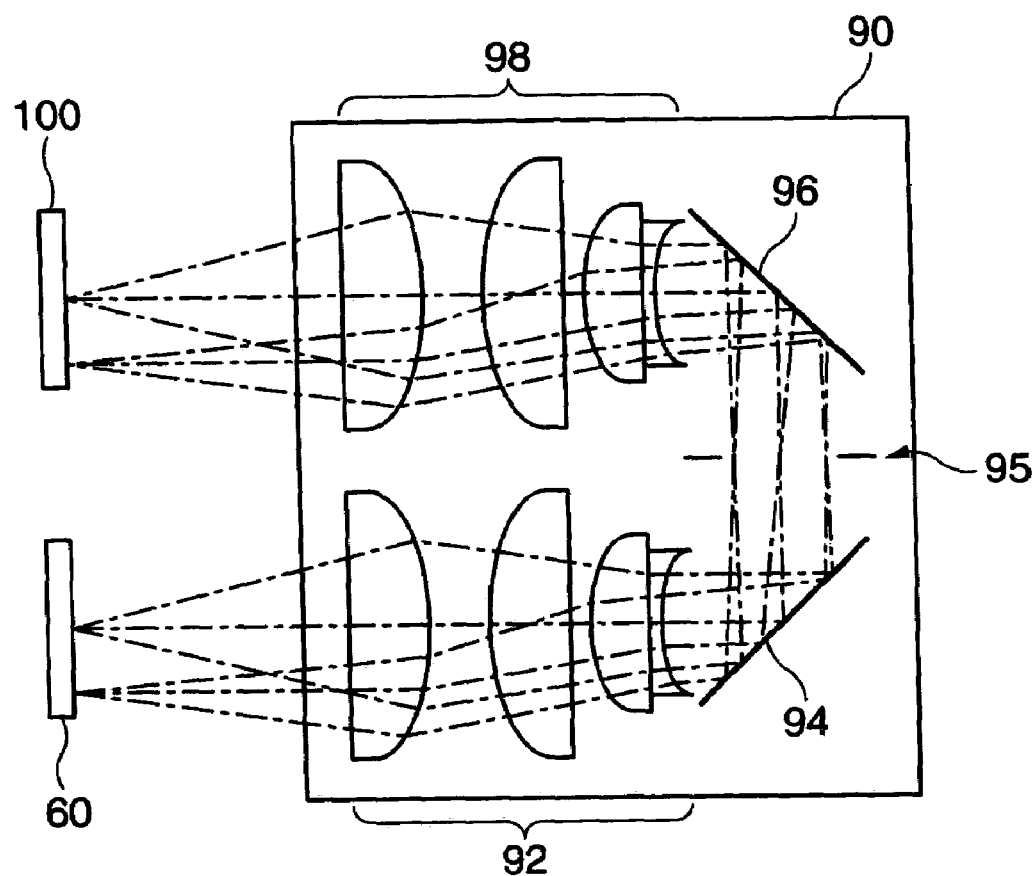
FIG. 3 is a structural side view of a relay lens system in an embodiment; 4

FIG. 3 is a structural side view of the relay lens system 90 in the exemplary embodiment. In FIG. 3, for the purpose of easy understanding, three color modulation light valves for the three primary colors are represented by one color modulation light valve 60 to be shown while the cross dichroic prism provided between the color modulation light valve 60 and the relay lens system 90 is omitted from drawing. The relay lens system 90, however, is optically equivalent to a structure shown in FIGS. 1, 2A and 2B.

The relay lens system 90 in FIG. 3 is for forming an optical image of the liquid crystal light valves 60B, 60G and 60R respectively for color modulation on a pixel surface of the liquid crystal light valve 100. The relay lens system 90 is a magnification unchanged image-forming lens including a first lens group 92 and a latter lens group 98, which are provided almost symmetrically with respect to an aperture stop 95. The first lens group 92 and the latter lens group 98 can include plural convex lenses and concave lenses and the relay lens system 90 have a both-sides telecentric characteristic. The shape, size, intervals for arrangement, number, telecentric characteristic and magnification of the lenses and other lens characteristics can be properly changed in accordance with a required characteristic and are not limited to an example shown in FIG. 3. The relay lens system 90 can include a plurality of lenses, so that it is superior in compensation of aberration and can transmit distribution of intensity formed by the liquid crystal light valves 60B, 60G and 60R respectively for color modulation precisely to the liquid crystal light valve 100.

Figure 4A:
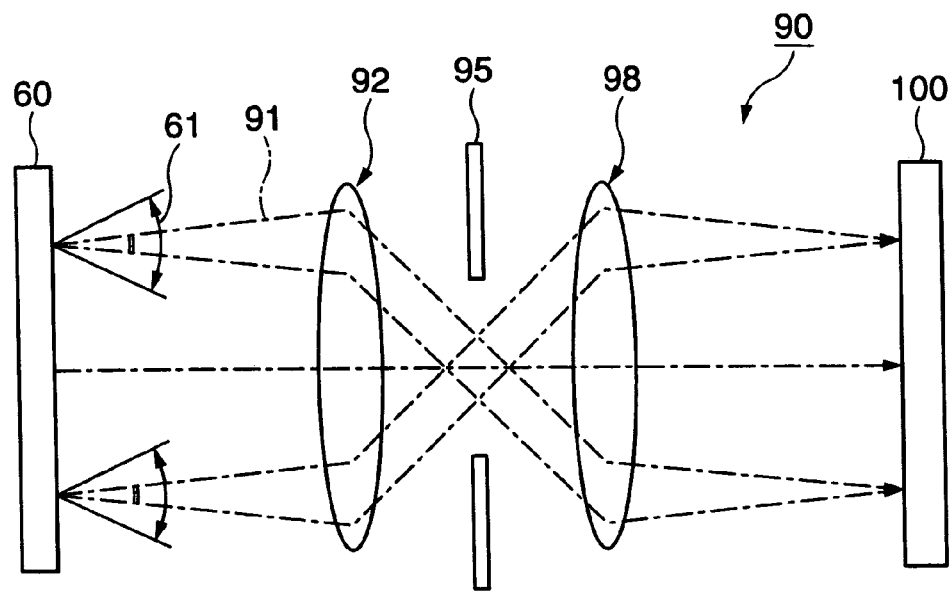
FIGS. 4A and 4B illustrate telecentric characteristics.
Figure 4B:
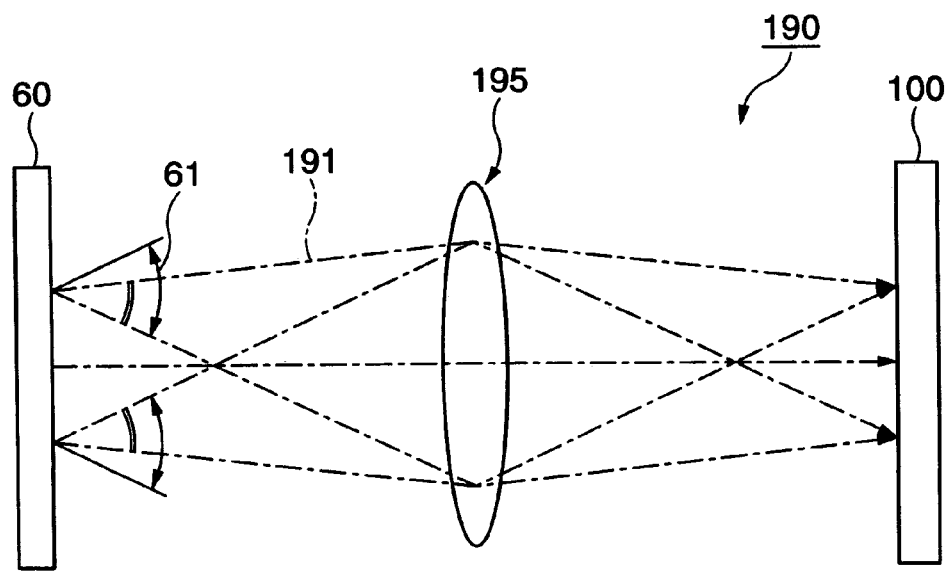

FIGS. 4A and 4B illustrates telecentric characteristics. FIG. 4A illustrates a relay lens system having a both-sides telecentric characteristic. FIG. 4B illustrates a relay lens system having no both-sides telecentric characteristic.

In a relay lens system 190 in FIG. 4B, light emitted from the color modulation light valve 60 is transmitted through a lens 195 to the intensity modulation light valve 100. In this case, light 191, which is emitted within a range with a part of a predetermined angle, of light 61, which is emitted from respective ranges of the color modulation light valve 60 within a range with the predetermined angle, is only transmitted to the intensity modulation light valve 100. In the respective ranges of the color modulation light valve 60, light emitted with a different angle is transmitted to the intensity modulation light valve 100. On the other hand, light is incident on the respective ranges of the intensity modulation light valve 100 with a different angle. The liquid crystal light valve generally has visual angle dependence, and therefore, is different in contrast in accordance with an incident/emitting angle of light. Accordingly, in the case of using light emitted from or incident on the respective ranges of the liquid crystal light valve at a different angle, a contrast in display image is different in the respective ranges of a screen. This causes deterioration of image displaying quality of the projector.

Contrary to the above, in the relay lens system 90 in FIG. 4A, light emitted from the color modulating light valve 60 is transmitted to the intensity modulation light valve 100 through the first lens 92, the stop 95 and the latter lens 98. In this case, light 91 at the center part of light 61 emitted from the color modulation light valve 60 is only transmitted to the intensity modulation light valve 100. That is to say, the light 91, which is emitted substantially parallel to an optical axis of the relay lens system 90 from the respective ranges of the color modulation light valve 60, is only used. As described above, a property that light, which is emitted within a range with a same angle, of light, which is emitted from any range of the liquid crystal light valve, can be used is an emitting-side telecentric character. On the other hand, a property that light can be incident on any range of the liquid crystal light valve within a range with a same angle is an incident-side telecentric characteristic. When the relay lens system 90 has a both-sides telecentric characteristic, an image contrast becomes substantially uniform in the respective ranges of a screen. This allows a projector having good quality in image display to be provided.

Returning to FIG. 3, in the relay lens system 90 in the exemplary embodiment 1, at least one of reflecting optical devices 94 and 96 can be provided between the plural lenses to bend an optical path. From the viewpoint of easy optical design, it is desirable to provide the reflecting optical devices 94 and 96 so that a lens group before the reflecting optical devices 94 and 96 would be symmetrical to a lens group thereafter. In FIG. 3, the first reflecting optical device 94 is provided between the stop 95 and the first lens group 92 while the latter reflecting optical device 96 is provided between the stop 95 and the latter lens group 98 so that the first lens group 92 would be arranged to be symmetrical to the latter lens group 98.

The first reflecting optical device 94 can be provided so as to upwardly reflect light incident horizontally from an entrance of the relay lens system 90. The latter reflecting optical device 96 is provided so as to horizontally reflect light, which is reflected on the first reflecting optical device, toward an exit of the relay lens system 90. That is to say, the relay lens system 90 is arranged to reverse a direction of transmitting light incident from the color modulation light valve 60 by the reflecting optical devices 94 and 96 to emit the light to the intensity modulation light valve 100. Accordingly, the horizontal length of the relay lens system 90 including the reflecting optical devices 94 and 96 is about half of that of the relay lens system including no reflecting optical device. This allows a projector to be miniaturized.

For the respective reflecting optical devices 94 and 96, it is possible to use a reflecting mirror. Further, a reflecting type of polarizer such as a wire grid type of polarizing filter and a polarizing beam splitter may be used other than a mirror. The reflection type of polarizer is for transmitting a part of a polarized light bundle and reflecting a part of the polarized light bundle. Especially, it is possible to use a reflection type of polarizer capable of transmitting one of straight polarized light bundles orthogonal each other and reflecting the other. A reflection type of polarizer may be used for both of the first reflecting optical device 94 and the latter reflecting optical device 96. It is also possible to use a reflection type of polarizer for one of the reflecting optical devices 94 and 96 and a reflecting mirror for the other.

Specifically, for a reflecting type of polarizer, used is a multi-layer structure film in which a thin film A having a double refraction characteristic and a thin film B having no double refraction characteristic are piled plurally. A refractive index of the thin film A in an X direction is arranged to be same as that of the thin film B. In this case, straight polarized light incident on the multi-layer structure film in the X direction is transmitted as it is since there is no difference in the X direction in refractive index between the respective layers. On the other hand, straight polarized light incident on the multi-layer structure film in a Y direction is reflected on an interface between the thin film A and the thin film B. In this case, a ratio of film thickness between the thin film A and the thin film B is set properly with respect to a relation with a wavelength of the incident light.

For a reflecting type of polarizer, it is also possible to use a wire grid type of polarizing filter. The wire grid type of polarizing filter is a kind of structural double refraction type of polarizing plate. The wire grid type of polarizing filter has a structure in which a minute groove extending in a predetermined direction is formed on a metal thin film formed on a transparent substrate. The metal thin film can be formed from aluminum, tungsten or such by vapor deposition or sputtering. The minute groove can be formed by combining double light bundle interference exposure, electronic line drawing, X-ray lithography or the like and etching. A pitch of the minute groove is arranged to be shorter than a wavelength of light to be reflected. This allows straight polarized light horizontal to the minute groove to be reflected, and thereby, vertical straight polarized light to be transmitted. The wire grid type of polarizing film is simple in structure, so that it can be easily manufactured. Further, using an inorganic material in the structure allows a heat-resistance characteristic to be extremely superior and optical absorption to hardly occur.

Figure 5:
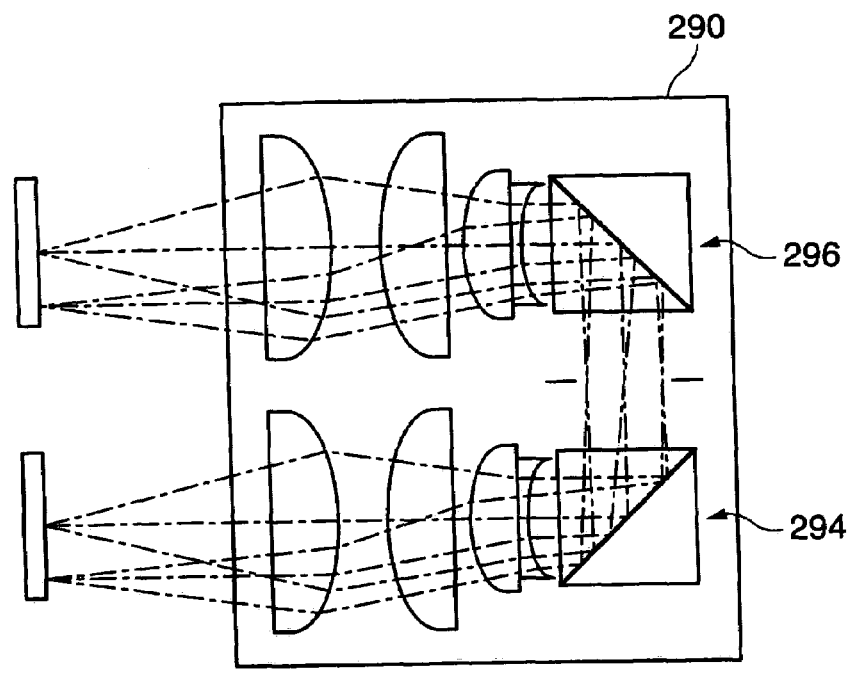
FIG. 5 is a side view of a relay lens system including a polarizing beam splitter.

FIG. 5 is a side view of a relay lens system using a polarizing beam splitter. A polarizing beam splitter, which is a kind of a reflecting type of polarizer, may be used for reflecting optical devices 294 and 296 of a relay lens system 290. An effect similar to that of the other reflecting types of polarizer can be also achieved in this case.

A liquid crystal panel used in the color modulation light valve is arranged so that a pair of substrates would sandwich a liquid crystal layer. Inside the pair of substrates, formed are an electrode and an oriented film, respectively. Polarizing plates are provided outside the pair of substrates, respectively. The polarizing plate is for transmitting only straight polarized light in a predetermined direction. The respective polarizing plates are arranged so that transmitting axes thereof would intersect at an angle of 90°. The electrodes of the pair of substrates are used for applying an electric field to the liquid crystal layer to change orientation of a liquid crystal molecule. A polarizing direction of straight polarized light incident on the liquid crystal panel is thus controlled to perform image display.

In any one of the above-mentioned reflection types of polarizer, one of the orthogonal straight polarized light bundles is transmitted while the other is reflected. Accordingly, using a reflection type of polarizer as a reflecting optical device of the relay lens system allows the reflection type of polarizer to function as a polarizing plate of a liquid crystal panel. Concretely, a reflection type of polarizer used as the first reflecting optical device 94 shown in FIG. 3 can function as an emitting-side polarizing plate of the color modulation light valve 60. A reflection type of polarizer used as the latter reflecting optical device 96 can function as an incident-side polarizing plate of the intensity modulating light valve 100. A reflecting axis direction of the respective reflection type of polarizers is accorded with a transmitting axis direction of the corresponding polarizing plates.

As described above, when the reflection type of polarizer of the relay lens system 90 functions as a polarizing plate of the liquid crystal panel, the polarizing plate of the liquid crystal panel can be omitted. This allows a cost to be reduced. A polarizing plate of the liquid crystal panel is generally formed from a polarizing device, which is formed from iodine or the like and which is adhered to a polarizing base material such as polyvinyl alcohol. Accordingly, there is a problem that the polarizing plate formed from an organic material has a low heat-resistance characteristic. Especially in a projector, it is required to radiate intensive light from the light source for the purpose of improving intensity of an image. Thus, plural polarizing plates having a low degree of polarization are used to restrain generation of heat of the individual polarizing plate. Contrary to the above, a wire grid type of polarizing film, which is formed from an inorganic material, is superior in heat-resistance. Accordingly, using a wire grid type of polarizing film as a reflecting optical device of the relay lens system allows the heat-resistance characteristic of the projector to be improved, and thereby, the intensity of an image to be improved.

Figure 6:
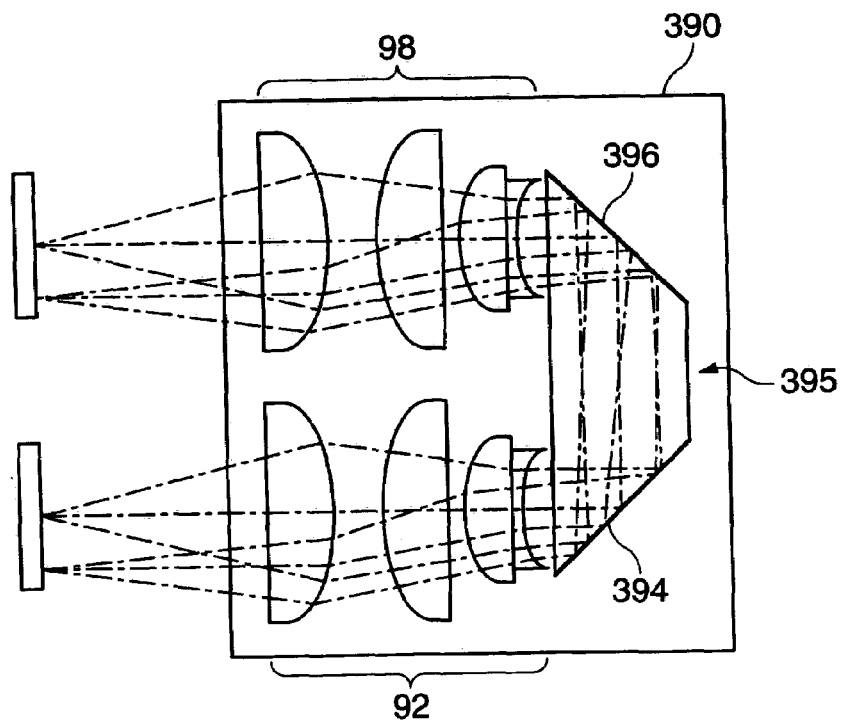
FIG. 6 is a side view of a relay lens system including a reflecting prism.

FIG. 6 is a side view of a relay lens system using a reflecting prism. In a relay lens system 390 shown in FIG. 6, a reflecting prism 395 is provided between an exit of the first lens group 92 and an entrance of the latter lens group 98. The reflecting prism is formed from a medium, such as glass, which has a refractive index of more than 1.0. Inclined reflecting surfaces 394 and 396 are provided on a lower end portion and an upper end portion of the reflecting prism 395 on an opposite side to a surface facing to the respective lens groups 92 and 98. Light incident from the first lens group 92 on the reflecting prism 395 is reflected on the reflecting surface 394 upward, further reflected on the reflecting surface 396 horizontally and emitted from the reflecting prism 395 to the latter lens group 98. The reflecting surfaces 394 and 396 can be formed from a reflecting mirror, a reflection type of polarizer, a wire grid polarizing filter or the like, similar to the above.

Figure 18:
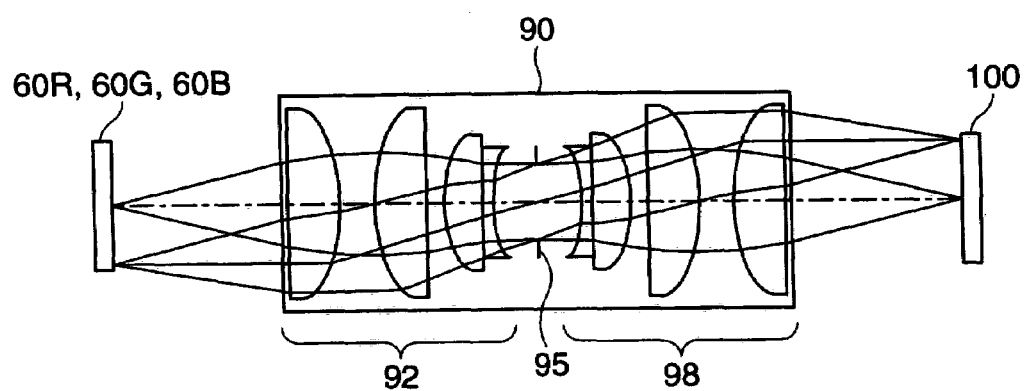
FIG. 18 illustrates a relay lens system of FIG. 17.

In the relay lens system in which an optical path is bent as shown in FIGS. 3 and 5, a space between the first lens group 92 and the latter lens group 98 should be widened more than the case of a relay lens system in straight arrangement shown in FIG. 18. This tends to cause limitation in optical design of the relay lens system. Contrary to the above, in the relay lens system 390 including the reflecting prism 395 as shown in FIG. 6, a medium having a refractive index of more than 1.0 is provided between the first lens group 92 and the latter lens group 98. Accordingly, an air-converted length of an optical path, which is an optical length, becomes short. This allows limitation in optical design of the relay lens system to be decreased, comparing with the cases of FIGS. 3 and 5.

Figure 7:
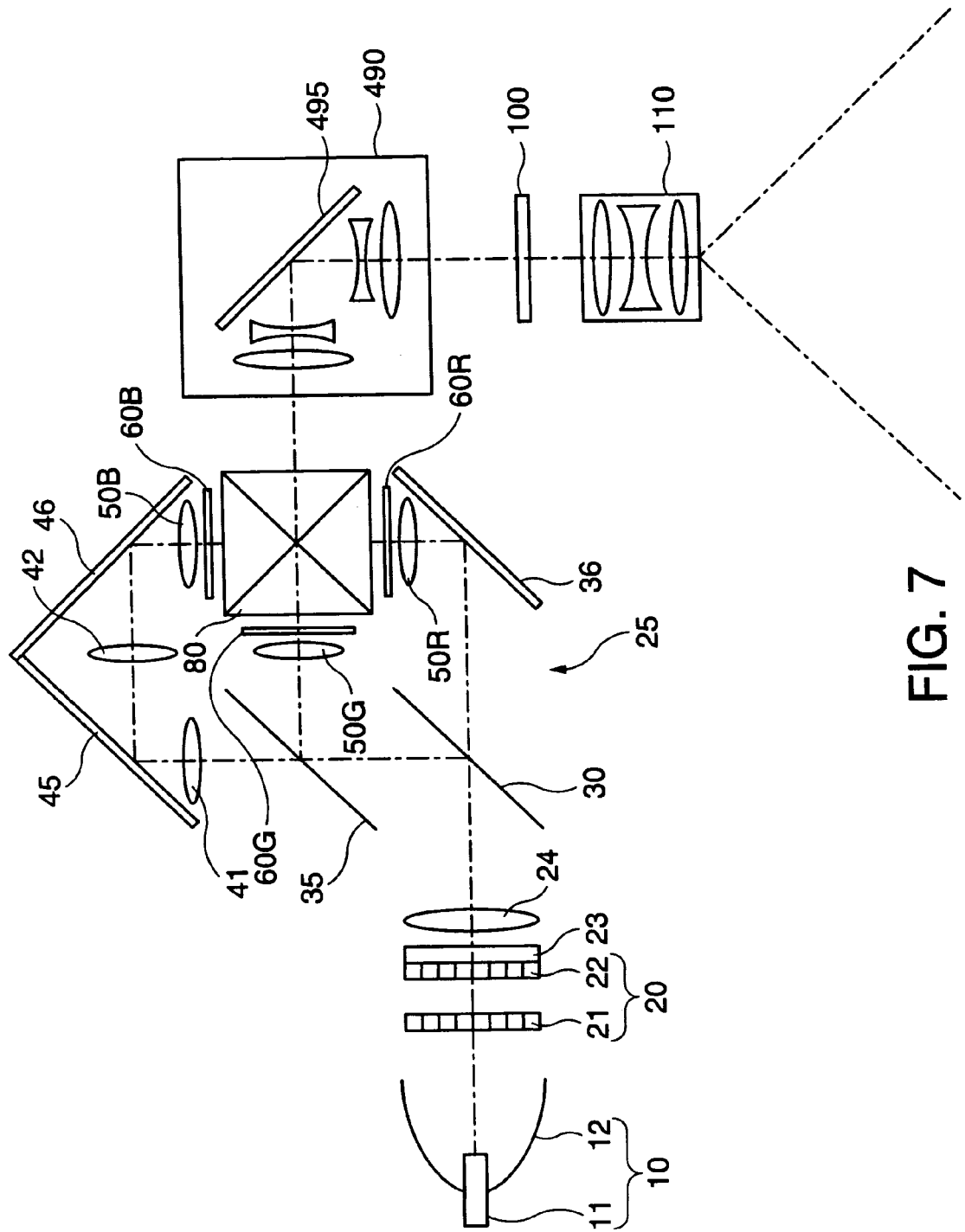
FIG. 7 is a plan view of a projector in a case of using one reflecting optical device for a relay lens system.

FIG. 7 is a plan view of an exemplary projector using one reflecting optical device in the relay lens system. In all of the above-mentioned relay lens systems, two reflecting optical devices are used for bending upward an optical path of incident light and for further bending horizontally the same so that the incident light would be emitted in a reverse direction. Contrary to the above, only one reflecting optical device 495 may be used for horizontally bending the optical path of the incident light like a relay lens system 490 shown in FIG. 7. Even in this case, a horizontal length of the relay lens system 490 using a reflecting optical device is around half of a horizontal length of the relay lens system using no reflecting optical device, which is shown in FIG. 18. This allows the projector to be miniaturized. Moreover, the relay lens system 490 shown in FIG. 7 has an advantage that efficiency in using light is higher than that of the relay lens system 90 using the two reflecting optical devices 94 and 96 shown in FIG. 3.

A concrete example of modulation of the color modulation light valve and the intensity modulation light valve on the basis of display image data will be described below in detail.

In the projector PJ1 (refer to FIG. 1), a color modulation signal generated from an image signal is used for driving the color modulation light valve (the liquid crystal light valves 60B, 60G and 60R shown in FIG. 1) while an intensity modulation signal is used for driving the intensity modulation light valve (the liquid crystal light valves 100 shown in FIG. 1) in order to achieve enlargement in intensity dynamic range and increase in gradation number. Modulation control of the liquid crystal light valve is carried out by a display controlling apparatus described below.

Figures 8, 9:
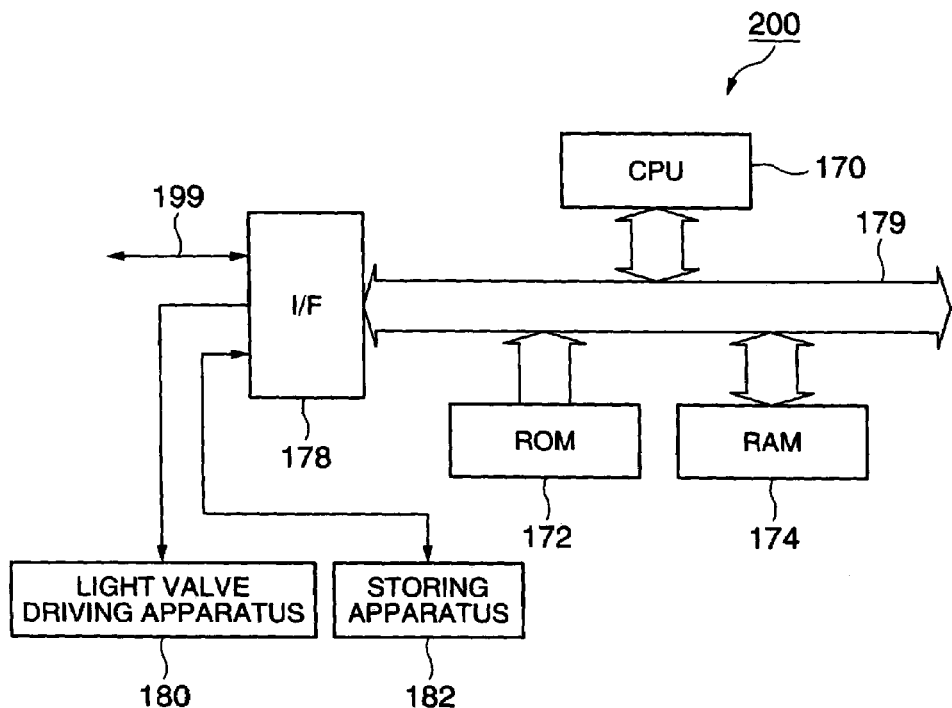
FIG. 8 is an exemplary block diagram showing a hardware structure of a display controlling device.
FIG. 9 illustrates a data structure of a controlling value registration table of an intensity modulating light valve.

FIG. 8 is an exemplary block diagram showing a hardware structure of a display controlling apparatus 200.

The display controlling apparatus 200 can include, as shown in FIG. 8, a CPU 170 for calculating and controlling a whole system on the basis of a controlling program, a ROM 172 in which the controlling program of the CPU 170 and the like are stored in a predetermined range in advance, a RAM 174 for storing data read from the ROM 172 and the like and a calculation result necessary in a calculating process of the CPU 170 and an I/F 178 for mediating input and output of data to an external apparatus. The above components are connected each other by a bus 179, which is a signal line for transferring data, so as to be able to give and receive data.

The I/F 178 is connected to a light valve driving apparatus 180 for driving the intensity modulation light valve and the color modulation light valve and a storing device 182 for storing data, a table and the like as a file, which are external apparatuses, and a signal line for connection to an external network 199.

In the storing device 182, stored are HDR display data and a controlling value registration table, which are for driving the intensity modulation light valve and the color modulation light valve.

The HDR image data is an image data capable of achieving a high intensity dynamic range, which cannot be achieved in a image format of the related art such as an sRGB. In the HDR image data, a pixel value showing an intensity level of a pixel is stored for all of the pixels. In Embodiment 1, as the HDR image data, used is a form in which a pixel value showing an intensity level for every three primary colors RGB for one pixel is stored as a floating-point value. A value of (1.2, 5.4, 2.3) is stored as a pixel value of one pixel, for example. It is also characterized to store a value relating physical intensity, such as radiance and luminance, as a value to be stored. The radiance and the luminance are referred to as intensity without discrimination in the following description since the intensity is radiance multiplied by a human luminous characteristic.

Details of a method of generating the HDR image data are described in "P. E. Debevec, J. Malik, "Recovering High Dynamic Range Radiance Maps from Photographs", Proceedings of ACM SIGGRAPH 97, PP. 367-378 (1997)", for example, which is incorporated herein in its entirety by reference.

FIG. 9 illustrates a data structure of a controlling value registration table 400 in which a controlling value to be inputted to the intensity modulation light valve is registered. Each record of the controlling value registration table (a look-up table; LUT) 400 can include a field in which a controlling value of the intensity modulation light valve is registered and a field in which transmittance of the intensity modulation light valve corresponding to each controlling value is registered.

In an example shown in FIG. 9, a controlling value of "0" and transmittance of "0.003" are respectively registered in a record in a first row. This means that the transmittance of the intensity modulation light valve is 0.3% when the controlling value of "0" is inputted to the intensity modulation light valve. FIG. 9 shows an example in the case that a gradation number of the intensity modulation light valve is 4 bits (a value of 0 to 15). A record to be registered, however, corresponds to the gradation number of the intensity modulation light valve in practice. In the case that the gradation number is 8 bits, for example, 256 records are registered.

Figure 10:
FIG. 10 illustrates a data structure of a controlling value registration table of a color modulating light valve.

FIG. 10 illustrates a data structure of a controlling value registration table 420R in which a controlling value to be inputted to the color modulation light valve is registered. Each record of the controlling value registration table (a look-up table; LUT) 420R can include a field in which a controlling value of the color modulation light valve 60R in FIG. 2A is registered and a field in which transmittance of the color modulation light valve 60R is registered.

In an example shown in FIG. 10, a controlling value of "0" and transmittance of "0.004" are respectively registered in a record in a first row. This means that the transmittance of the color modulation light valve is 0.4% when the controlling value of "0" is inputted to the color modulation light valve. FIG. 10 shows an example in the case that a gradation number of the color modulation light valve is 4 bits (a value of 0 to 15). A record to be registered, however, corresponds to the gradation number of the color modulation light valve in practice. In the case that the gradation number is 8 bits, for example, 256 records are registered.

A data structure of a controlling value registration table corresponding to the color modulation light valves 60B and 60G in FIG. 2A is not particularly shown in the drawings, but is similar to a data structure of the controlling value registration table 420R in FIG. 10. In some cases, however, different transmittance is registered for a same controlling value.

A method of generating a controlling value of each light valve from the above-mentioned HDR image data to drive a projector will be described hereinafter.

When Rp denotes an intensity level of a pixels p in the HDR image data, Tp denotes an optical modulation ratio of a region corresponding to the pixel p in a whole projector, T1 denotes transmittance of a region corresponding to the pixel p in the intensity modulation light valve and T2 denotes transmittance of a region corresponding to the pixel p in the color modulation light valve, the following formulas (1) and (2) are applicable:

$$Rp = Tp \times Rs \quad (1)$$

$$Tp = T1 \times T2 \times G \quad (2)$$

wherein Rs denotes intensity of a light source, G denotes a gain and both of them are a constant.

When the intensity level Rp (R, G, B) of the pixel p is (1.2, 5.4, 2.3) and the intensity Rs (R, G, B) of the light source is (10000, 10000, 10000), for example, the optical modulation ratio Tp of the pixel P is (1.2, 5.4, 2.3)/(10000, 10000, 10000)=(0.00012, 0.00054, 0.00023).

Figure 11:
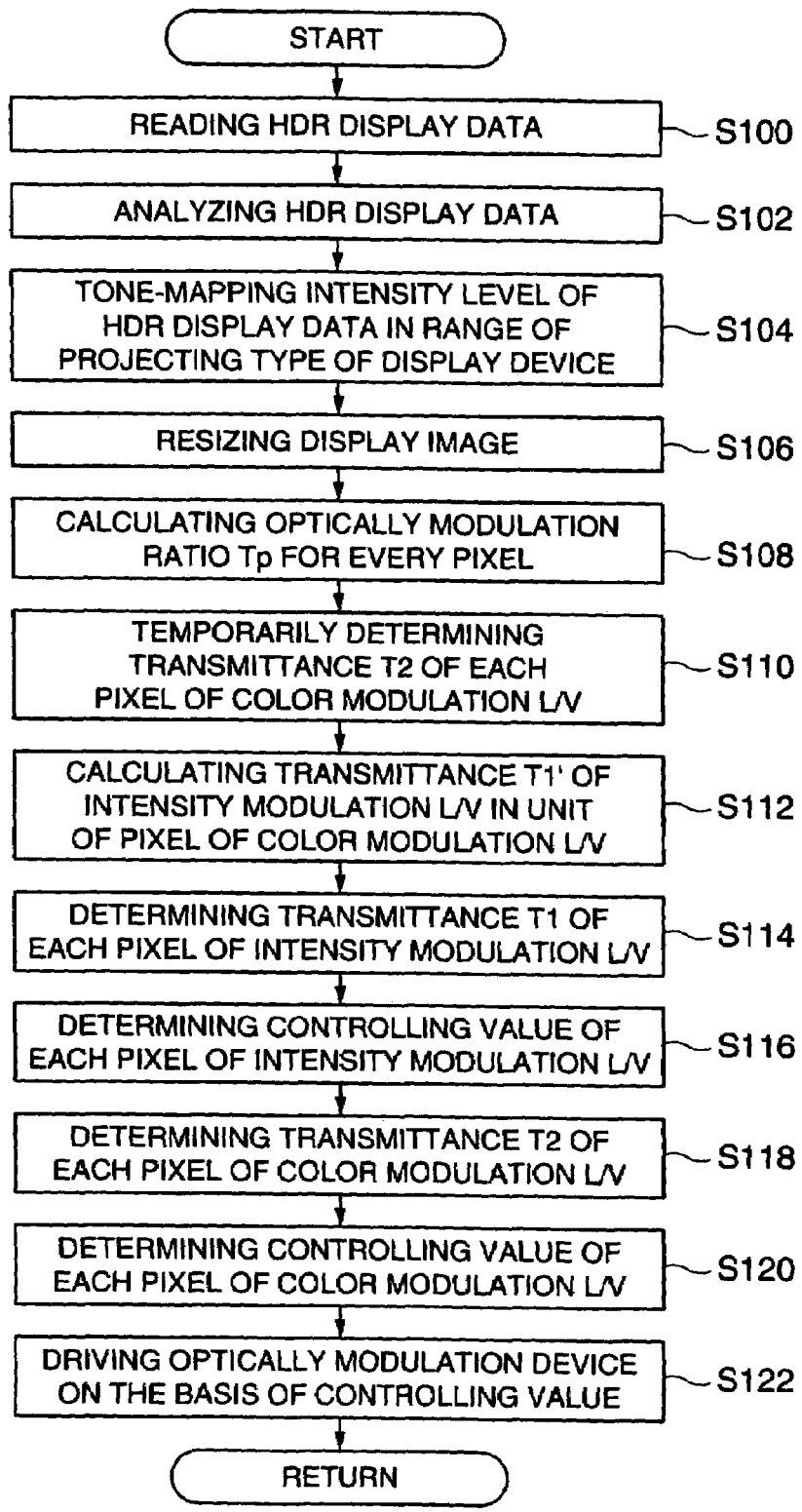
FIG. 11 is a flowchart of a method of generating a controlling value.

FIG. 11 is a flowchart of an exemplary method of generating a controlling value.

First, in Step S100, the CPU 170 reads the HDR image data from the storing device 182.

The process then goes to Step S102 to analyze the read HDR image data for calculation of a histogram of a pixel value, maximum, minimum and average values of the intensity level and the like. A result of the analysis is used for automatic image compensation in which a dark scene is made lighter, an excessively light scene is made darker or a middle part contrast is coordinated or for tone mapping.

Then, the process goes to Step S104. In Step S104, the intensity level of the HDR image data is tone-mapped into an intensity dynamic range of a projector on the basis of the result of the analysis in Step S102.

Figure 12:
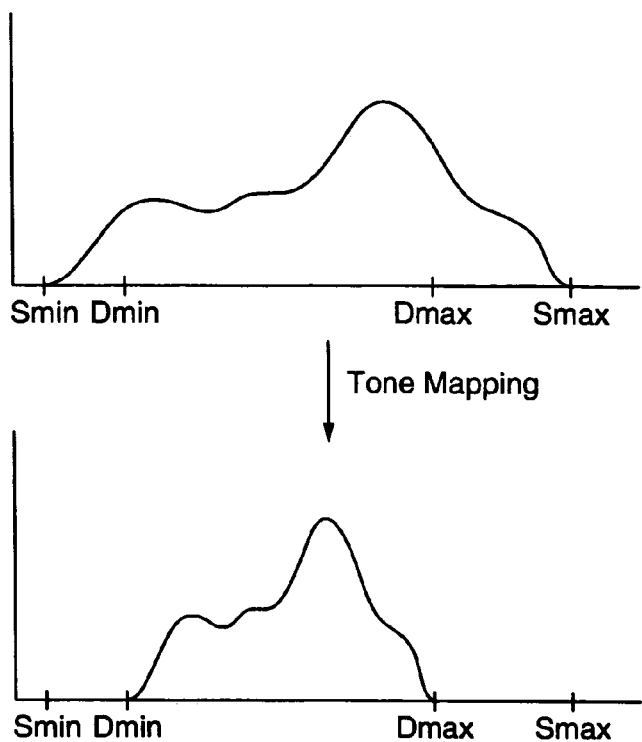
FIG. 12 illustrates a tone mapping process.

FIG. 12 illustrates a tone mapping process. In FIG. 12, Smin denotes the minimum vale of the intensity level included in the HDR image data while Smax denotes the maximum value of the same, in accordance with the result of analyzing the HDR image data. Furthermore, Dmin denotes the minimum value of the intensity dynamic range of a projector while Dmax denotes the maximum value of the same. In an example shown in FIG. 12, Smin is smaller than Dmin and Smax is larger than Dmax. Under such a condition, the HDR image data cannot be displayed properly. Accordingly, normalization is carried out so that a histogram of Smin to Smax would be within a range from Dmin to Dmax.

Details of tone mapping are described in "F. Drago, K. Myszkowski, T. Annen, N. Chiba, "Adaptive Logarithmic Mapping For Displaying High Contrast Scenes", Eurographics 2003, (2003)", for example, which is incorporated herein by reference in its entirety.

Following to the above, the process goes to Step S106 in FIG. 11. In Step S106, the HDR image is resized (enlarged or scaled down) in accordance with resolution of the color modulation light valve (a pixel number). In this case, the HDR image is resized with an aspect ratio of the HDR image being maintained. As a resizing method, an average value method, a median value method and a nearest neighbor method can be considered, for example.

Then, in Step S108, the optical modulation ratio Tp is calculated for each pixel of the resized image by means of the above-mentioned formula (1) on the basis of the intensity level Rp of each pixel of the resized image and the intensity Rs of the light source 10.

In Step S110 following to the above, an initial value (0.2, for example) is temporarily determined as the transmittance T2 of each pixel of the color modulation light valve.

The process then goes to Step S112 in which the transmittance T1' of a range of the intensity modulation light valve corresponding to each pixel of the color modulation light valve is calculated. Concretely, the transmittance T1' of the region is calculated by means of the above-mentioned formula (2) on the basis of the optical modulation ratio Tp calculated in Step S108, the transmittance T2 temporarily determined in Step S110 and the gain G. In this case, the transmittance T1' of one same region is calculated for each of the three primary colors RGB since the color modulation light valve comprises three liquid crystal light valves 60B, 60G and 60R. An average value or the like of the transmittance calculated for the respective three primary colors RGB is considered to be the transmittance T1' of the said region since the intensity modulation light valve comprises one liquid crystal light valve 100.

Then, in Step 114, the transmittance T1 for each pixel of the intensity modulation light valve is calculated. Concretely, an average value in weighting of the transmittance T1' of a region overlapping with a pixel of the intensity modulation light valve among the transmittance T1' of the respective ranges of the intensity modulation light valve, which are calculated in Step S112, is calculated to obtain the transmittance T1 of the said pixel. The weighting is carried out on the basis of an area ratio of overlapping pixels.

The process goes to Step S116 after the above to read a controlling value corresponding to the calculated transmittance T1 for the respective pixels of the intensity modulation light valve from the controlling value registration table 400 shown in FIG. 9. In reading the controlling value, the transmittance most approximate to the calculated transmittance T1 is selected from the controlling value registration table 400 to read the controlling value corresponding to the selected transmittance. In selecting, using dichotomizing search, for example, allows high-speed retrieval to be achieved.

Following to the above, in Step S118 in FIG. 11, the transmittance T2 is calculated for each pixel of the color modulation light valve. Concretely, calculated is an average value in weighting of the transmittance T1 of a pixel overlapping in an optical path with a pixel of the color modulation light valve among the transmittance T1 of the respective pixels of the intensity modulation light valve, which are calculated in Step S114. The weighting is carried out on the basis of an area ratio of overlapping pixels. After the above, the transmittance T2 of the said pixel is calculated by means of the above-mentioned formula (2) on the basis of an average value of the calculated transmittance T1, the optical modulation ratio Tp calculated in Step S108 and the gain G.

The process then goes to Step S120 in which a controlling value corresponding to the calculated transmittance T2 for the respective pixels of the color modulation light valve is read from the controlling value registration table 420R shown in FIG. 10 and such. In reading the controlling value, the transmittance most approximate to the calculated transmittance T2 is selected from the controlling value registration table 420R and such to read the controlling value corresponding to the selected transmittance. In selecting, using dichotomizing search, for example, allows high-speed retrieval to be achieved.

Then, in Step S122 in FIG. 11, the controlling values determined in Steps S116 and S120 are stored in a light valve driving apparatus. Following to the above, the light valve driving apparatus outputs the stored controlling values to the respective light valves to drive the light valves.

Next, a process of generating a controlling value to be inputted to the color modulation light valve (the liquid crystal light valves 60B, 60G and 60R) and the intensity modulation light valve (the liquid crystal light valve 100) will be described on the basis of FIGS. 11 to 16C.

In the following description, exemplified is a case that the color modulation light valves (the liquid crystal light valves 60B, 60G and 60R) have resolution of laterally 18 pixels× longitudinally 12 pixels and a gradation number of 4 bits while the intensity modulation light valve (the liquid crystal light valve 100) has resolution of laterally 15 pixels×longitudinally 10 pixels and a gradation number of 4 bits. All of the drawings of the color modulation light valve and the intensity modulation light valve are in view from a light source 10 side.

Figure 13:
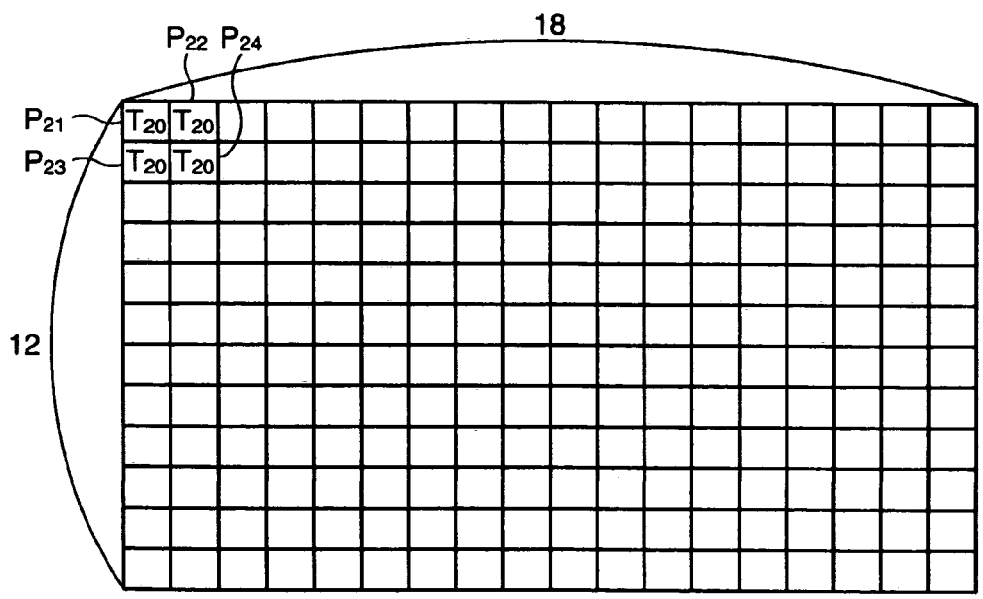
FIG. 13 illustrates temporary determination of transmittance of a color modulating light valve.

FIG. 13 illustrates a process of temporarily determining the transmittance T2 of the color modulation light valve.

In Step S110 (refer to FIG. 11, the same in the following description), the transmittance T2 of each pixel of the color modulation light valves is temporarily determined. When pixels in the upper left four sections of the color modulation light valve are denoted by 21 (the upper left), 22 (the upper right), 23 (the lower left) and 24 (the lower right), an initial value T20 is assigned to the transmittance T2 of the pixels 21 to 24, as shown in FIG. 13.

Figure 14:
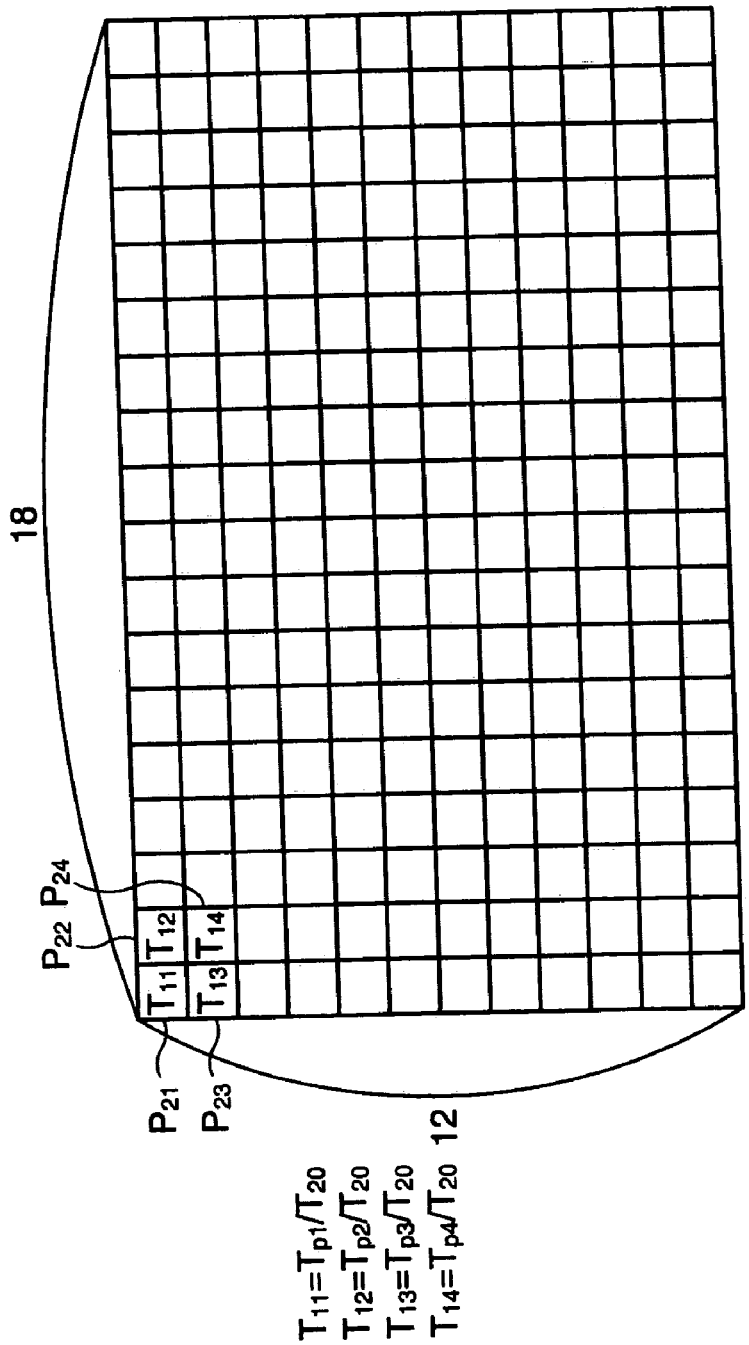
FIG. 14 illustrates calculation of transmittance in each range of an intensity modulating light valve, which corresponds to each pixel of a color modulating light valve.

FIG. 14 illustrates a process of calculating the transmittance T1' of a region of the intensity modulation light valve, which is corresponding to each pixel of the color modulation light valve.

In Step S112, calculated is the transmittance T1' of the region of the intensity modulation light valve, which is corresponding to each pixel of the color modulation light valve. As for the pixels 21 to 24 of the color modulation light valves, the transmittance T11 to T14 of the regions of the intensity modulation light valve corresponding to the pixels 21 to 24 can be calculated by the following formulas (3) to (6):

$$T11 = Tp1/T20 \tag{3}$$

$$T12 = Tp2/T20 \tag{4}$$

$$T13 = Tp3/T20 \tag{5}$$

$$T14 = Tp4/T20 \tag{6}$$

wherein Tp1 to Tp4 denote the optical modulation ratios of the pixels 21 to 24 and the gain G is assumed to be "1", as shown in FIG. 14.

When Tp1=0.00012, Tp2=0.05, Tp3=0.02, Tp4=0.01 and T20=0.1, for example, T11=0.0012, T12=0.5, T13=0.2 and T14=0.1 in accordance with the above-mentioned formulas (3) to (6).

Figure 15A:
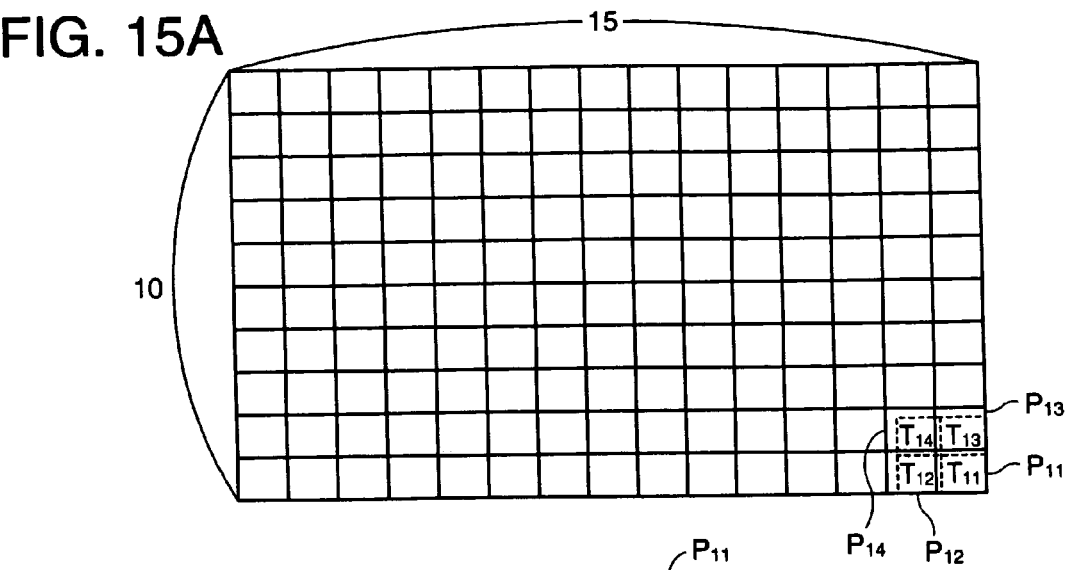
FIGS. 15A to 15C illustrate determination of transmittance of each pixel of an intensity modulating light valve.
Figure 15B:
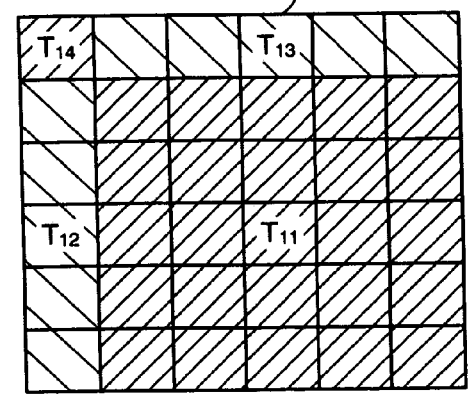
Figure 15C:
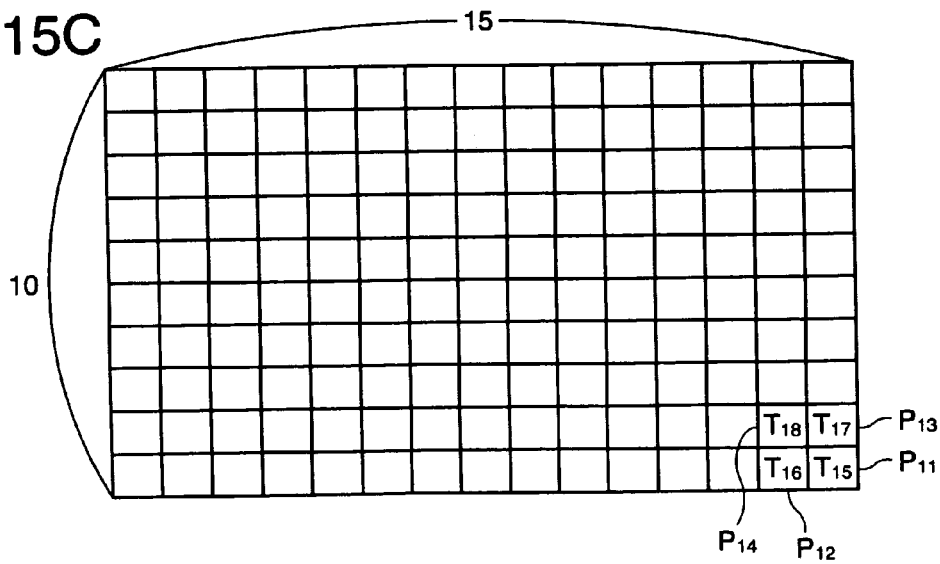

FIGS. 15A to 15C illustrate a process of determining the transmittance T1 of each pixel of the intensity modulation light valve.

In Step S114, the transmittance T1 of each pixel of the intensity modulation light valve is determined. There is a relation between the intensity modulation light valve and the color modulation light valve such that they are image-formed by means of the relay lens system 90 so that images thereof would be inverted each other. Accordingly, the pixels in the upper left four sections of the color modulation panel are image-formed on the lower right part of the intensity modulation light valve. The pixels in the lower right four sections of the intensity modulation light valve are thus denoted by 11 (the lower right), 12 (the lower left), 13 (the upper right) and 14 (upper left), as shown in FIG. 15A. The pixel 11 overlaps with the pixels 21 to 24 (refer to FIG. 14) in the optical path since the color modulation light valve and the intensity modulation light valve are different in resolution. Considering that resolution of the color modulation light valve is 18×12 while that of the intensity modulation light valve is 15×10, the pixel 11 can be sectioned into rectangular regions of 6×6 on the basis of the least common multiple of a pixel number of each light valve, as shown in FIG. 15B. An area ratio of the pixel 11 overlapping respectively with the pixels 21 to 24 is 25:5:5:1.

Accordingly, transmittance T15 of the pixel 11 can be calculated by means of the following formula (7):

$$T15 = (T11 \times 25 + T12 \times 5 + T13 \times 5 + T14 \times 1)/36 \quad (7)$$

When T11=0.0012, T12=0.5, T13=0.2 and T14=0.002, for example, T15=0.1008 in accordance with the above-mentioned formula (7).

Transmittance T16 to T18 of the pixels 12 to 14 shown in FIG. 15C can be also obtained by calculating an average value in weighting on the basis of an area ratio, similarly to the pixel p11.

Then, in Step S116 in FIG. 11, the controlling value corresponding to the transmittance T1 calculated for every pixel of the intensity modulation light valve is read from the controlling value registration table 400 shown in FIG. 9. In the above case, for example, it is considered that the most approximate value is 0.09 since T15=0.1008, made reference to the controlling value registration table 400. Therefore, "8" is read from the controlling value registration table 400 as a controlling value of the pixel p11.

FIG. 16 illustrates a process of determining the transmittance T2 of each pixel of the color modulation light valve.

Figure 16A:
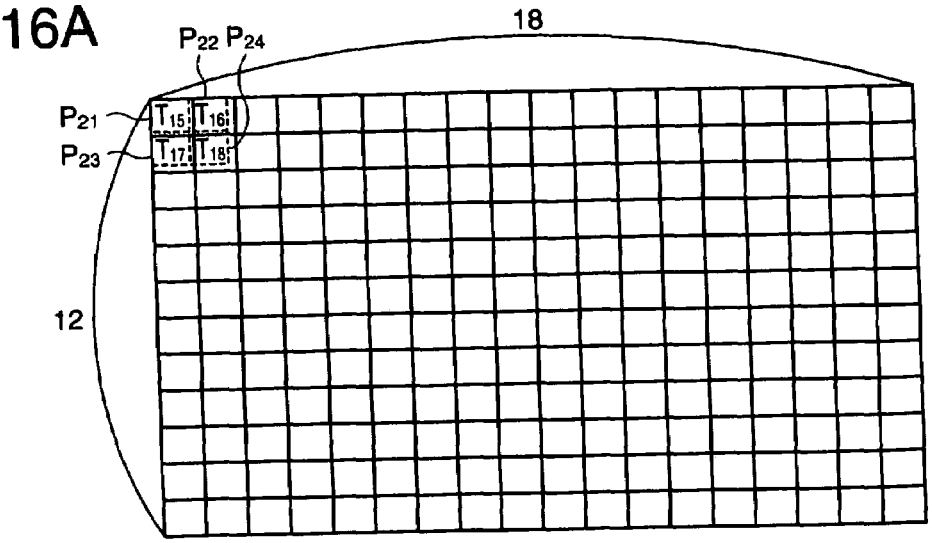
FIGS. 16A to 16C illustrate determination of transmittance of each pixel of a color modulating light valve.
Figure 16B:
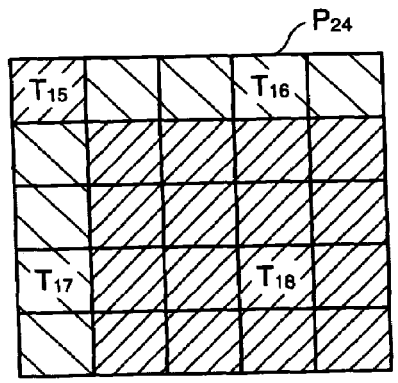

In Step S118, the transmittance T2 of each pixel of the color modulation light valve is determined. As described above, the color modulation light valve and the intensity modulation light valve are different in resolution. Accordingly, the pixel 24 overlaps with the pixels 11 to 14 (refer to FIGS. 15A to 15C) in the optical path, as shown in FIG. 16A. The pixel 24 can be sectioned into rectangular regions of 5×5 on the basis of the least common multiple of a pixel number of the intensity modulation right valve, as shown in FIG. 16B, since resolution of the color modulation light valve is 18×12 while that of the intensity modulation light valve is 15×10. An area ratio of the pixel 24 overlapping respectively with the pixels 11 to 14 is 1:4:4:16. Accordingly, transmittance T19 of the intensity modulation light valve corresponding to the pixel 24 can be calculated by means of the following formula (8) as an average value in weighting of the transmittance of the pixels 11 to 14:

$$T19 = (T15 \times 1 + T16 \times 4 + T17 \times 4 + T18 \times 16)/25 \quad (8)$$

Transmittance T24 of the pixel 24 can be calculated by means of the following formula (9):

$$T24 = Tp4/T19 \quad (9)$$

wherein the gain G is "1".

When T15=0.09, T16=0.33, T17=0.15, T18=0.06 and Tp4=0.01, for example, T19=0.1188 and T24=0.0842 in accordance with the formulas (8) and (9).

Figure 16C:
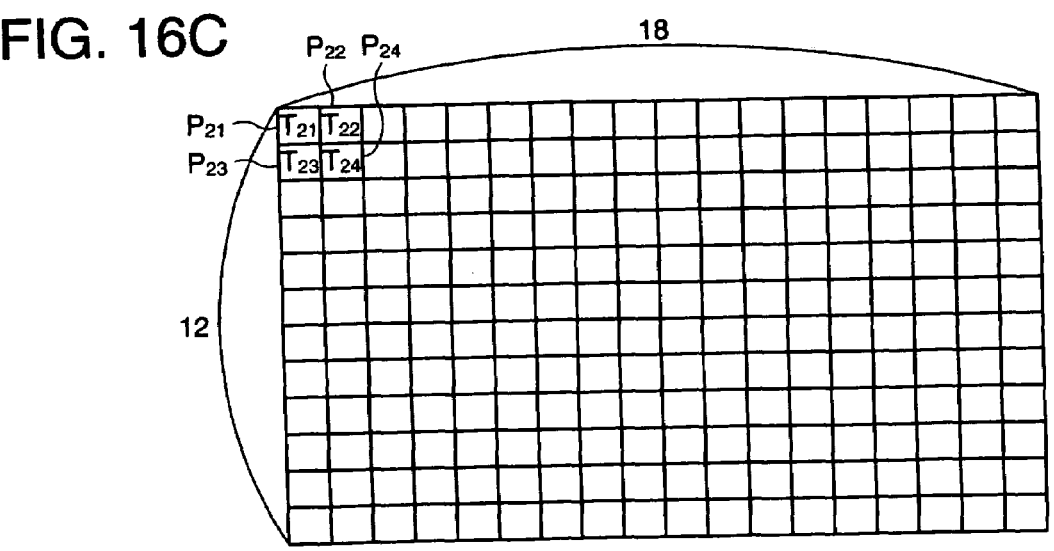
Figure 17:
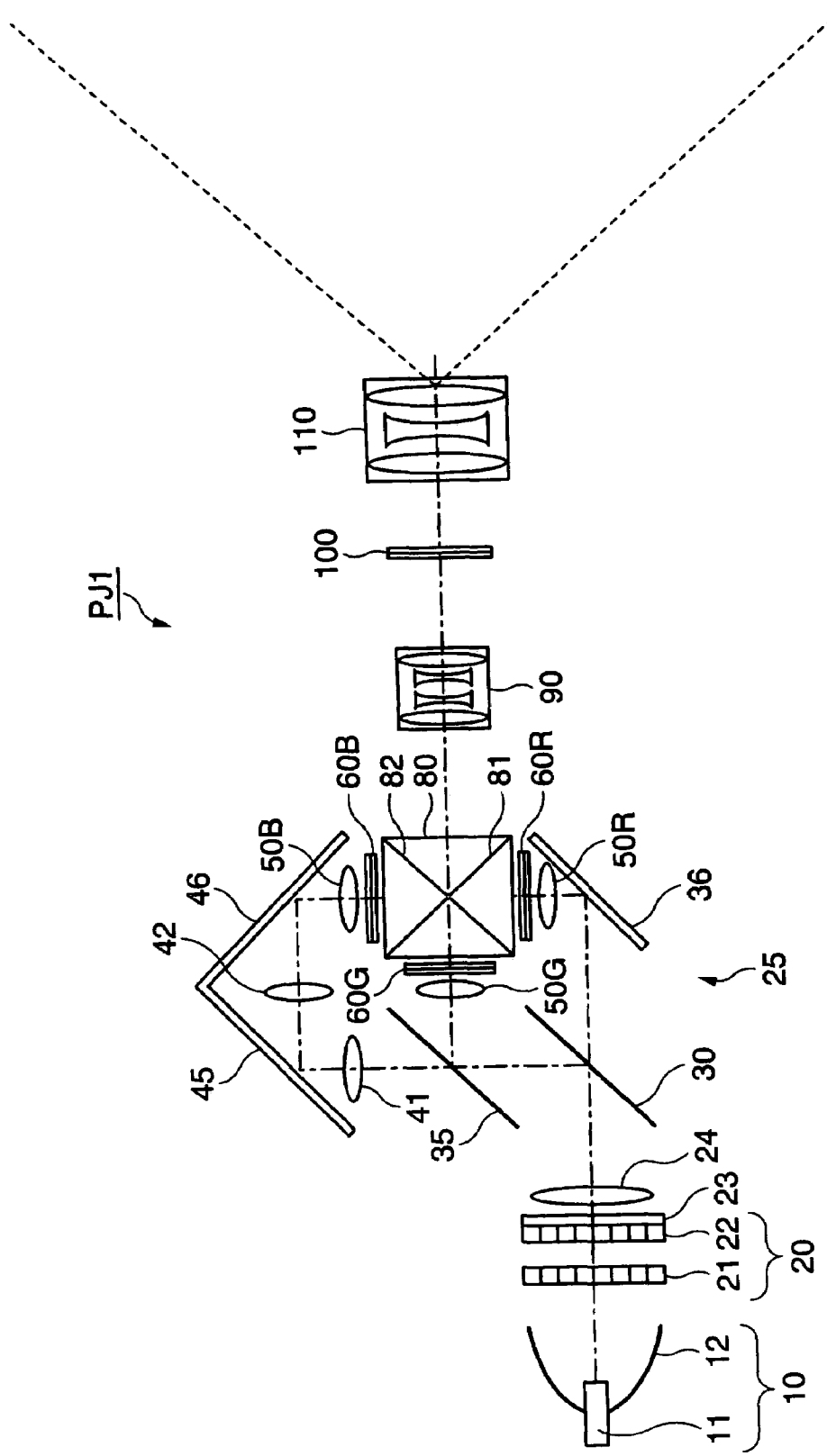
FIG. 17 is a plan view of a projector developed by inventors of the invention.

Transmittance T21 to T23 of the pixels p21 to p23 shown in FIG. 16C can be also obtained by calculating an average value in weighting on the basis of an area ratio, similarly to the pixel p24.

Then, in Step S120 in FIG. 11, the controlling value corresponding to the transmittance T2 calculated for every pixel of the color modulation light valve is read from the controlling value registration table 420R or such shown in FIG. 10. When T24=0.0842 for the pixel 24 of the liquid crystal light valve 60R, for example, it is considered that the most approximate value is 0.07, made reference to the controlling value registration table 420R. Therefore, "7" is read from the controlling value registration table 420R as a controlling value of the pixel p24.

In Step S122, the controlling values determined in Steps S116 and S120 are stored in a light valve driving apparatus. The light valve driving apparatus then inputs the stored controlling values into the respective light valves to carry out optical modulation and intensity modulation for driving the projector.

In the exemplary embodiment, a three-plates type of projector is exemplified, but it should be understood that the invention can be applied to a single-plate type of projector. The single-plate type of projector chiefly can include a light source, an uniform illumination system, a first optically modulating device, a relay lens system, a second optically modulating device and a projecting lens. In the case of using a white light source for the light source, a liquid crystal light valve used as the first optically modulating device or the second optically modulating device is provided with a color filter.

Further, the invention can be applied to a direct-viewing type of display device although a projecting type of display device is exemplified in exemplary embodiment. In the direct-viewing type of display device, image light modulated in the second modulation device is directly seen. The direct-viewing type of display device has an advantage that it is suitable for a view in a light place.

Moreover, the intensity modulation is arranged to be performed by means of the intensity modulation light valve for light, which is color-modulated by means of the color modulation light valve, in exemplary embodiment. The invention, however, is not limited to the above. It is possible that the light, which is intensity-modulated by the intensity modulation light valve, is arranged to be color-modulated by means of the color modulation light valve. Furthermore, the intensity of light is arranged to be modulated in two steps by means of the intensity modulation light valve and the color modulation light valve, but the invention is not limited to the above. The intensity of light may be modulated in two steps by two sets of intensity modulation light valve.

In exemplary embodiment, a single light source for emitting white light is used as the light source 10 and the white light is divided into light in the three primary colors RGB. The invention, however, is not limited to the above. It is possible to apply a structure in which three light sources of a light source for emitting red light, a light source for emitting blue light and a light source for emitting green light, which respectively correspond to the three primary colors RGB, are used without dividing the white light.

In addition, an active matrix type of liquid crystal display device is used for the liquid crystal light valves 60B, 60G, 60R and 100 in exemplary embodiment. The invention, however, is not limited to the above. A passive matrix type of liquid crystal display device and a segment type of liquid crystal display device may be used for the liquid crystal light valves 60B, 60G, 60R and 100. The active matrix type of liquid crystal display has an advantage of enabling precise gradation display. On the other hand, the passive matrix type of liquid crystal display device and a segment type of liquid crystal display device have an advantage of enabling low-cost manufacture.

In exemplary embodiment, the intensity modulation light valve or the color modulation light valve is formed from a liquid crystal panel, which is a transmission type of optically modulating device. The invention, however, is not limited to the above. A reflecting type of optically modulating device such as a DMD (digital micro-mirror device) may be used for the above.

Further, a polarization compensating optical system for compensating polarization of light may be provided between the relay lens system and the intensity modulation light valve. The polarization compensating optical system may be arranged to include a dielectric film or a rectifier, which has a polarization compensating function.

In the above respective exemplary embodiments, described is a case that a controlling program stored in the ROM 172 in advance is executed in executing a process shown in a flowchart in FIG. 11. The invention, however, is not limited to the above. A program indicating the above process may be read into the RAM 174 from a storing medium in which the program is stored so as to be executed.

In the above context, the storing medium is a semiconductor storing medium such as a RAM and a ROM, a magnetically storing type of storing medium such as an FD and an HD, an optically reading type of storing medium such as a CD, a CDV, an LD and a DVD or a magnetically storing type/optically reading type of storing medium such as an MO. Any storing medium can be included in the above storing medium regardless of the reading methods such as electronic, magnetic and optical methods so long as the storing medium can be read by means of a computer.

Preferred embodiments in accordance with the invention have been described above, made reference to the attached drawings. It should be understood that the invention is not limited to the exemplary embodiments. It is obvious that a person skilled in the art can conceive various kinds of modification and revision within a range of technical ideas described in claims. The modification and revision are naturally considered to belong to the technical range of the invention.

What is claimed is:

1. An image display device that modulates light from a light source on the basis of display image data to display an image, the image display device comprising:
   a first optically modulating device that modulates light from the light source;
   a second optically modulating device that modulates light from the first optically modulating device;
   a relay lens system including plural lenses, the relay lens system provided between the first optically modulating device and the second optically modulating device that forms an optical image of the first optically modulating device on a light-receiving surface of the second optically modulating device; and
   at least one reflecting optical device provided between the plural lenses, the at least one reflecting optical device being non-movable relative to the first optically modulating device.

2. The image display device according to claim 1, the relay lens system reversing a direction of transmitting light incident from the first optically modulating device by the reflecting optical device to emit the light to the second optically modulating device.

3. The image display device according to claim 1, the relay lens system having a both-sides telecentric characteristic.

4. The image display device according to claim 1, a first lens group and a latter lens group with respect to the reflecting optical device being symmetrically provided, the first lens group and the latter lens group being part of the relay lens system.

5. The image display device according to claim 1, the reflecting optical device being a reflecting type of polarizer.

6. The image display device according to claim 1, the reflecting optical device being a wire grid type of polarizing filter.

7. The image display device according to claim 1, the reflecting optical device being a polarizing beam splitter.

8. The image display device according to claim 1, the reflecting optical device being formed on a prism surface of a reflecting prism.

9. A projector, comprising:
   the image display device according to claim 1; and
   a projecting unit.

10. The image display device according to claim 1, the relay lens system being arranged to transmit the light from the first optically modulating device in a direction towards the light source.

11. The image display device according to claim 1, the at least one reflecting optical device including only two reflecting surfaces.

12. The image display device according to claim 1, the reflecting optical device including a first reflecting optical device and a second reflecting optical device, the first reflecting optical device upwardly reflects light incident horizontally from an entrance of the relay lens system, the second reflecting optical device horizontally reflects light, which is reflected on the first reflecting optical device.

13. The image display device according to claim 1, the at least one reflecting optical device being non-movable relative to the first and second optically modulating devices.

14. The image display device according to claim 1, the first optically modulating device comprising:
   two dichroic mirrors that separate the light from the light source into three primary color lights;
   a first mirror that reflects one of the three primary color lights; and
   a second mirror and a third mirror that reflect another of the three primary color lights,
   the first, second and third mirrors each being different from the at least one reflecting optical device provided between the plural lenses.

* * * * *